Aug. 11, 1953  J. M. McKINLEY ET AL  2,648,260
APPARATUS FOR MANUFACTURING THIN WALL PRECISION BEARINGS
Filed Aug. 21, 1948  2 Sheets-Sheet 1

INVENTORS
JOHN M. McKINLEY
HOWARD PHILLIPS
FRANK SICILIANO
JOHN McNEICE
BY Fay, Golrick & Fay
ATTORNEYS

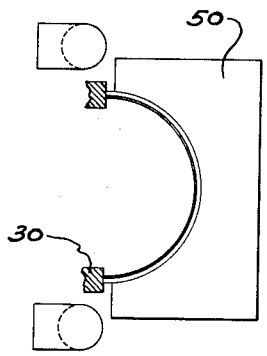
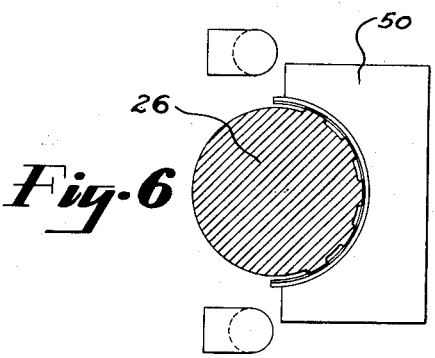
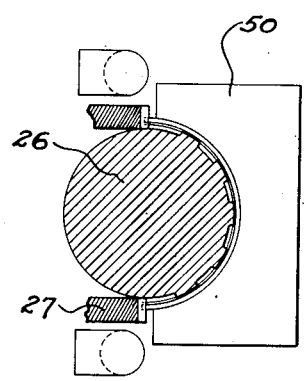
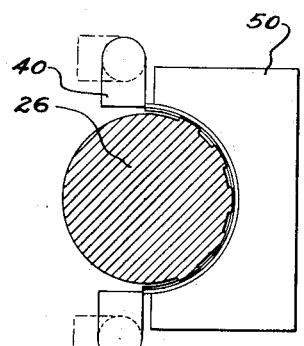
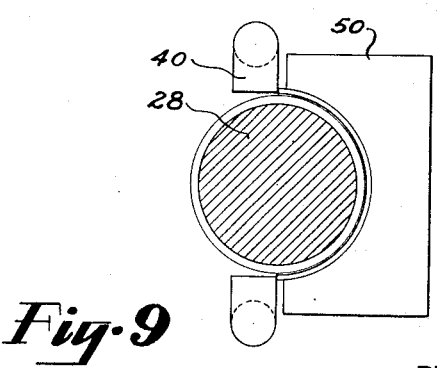

Patented Aug. 11, 1953

2,648,260

UNITED STATES PATENT OFFICE

2,648,260

APPARATUS FOR MANUFACTURING THIN WALL PRECISION BEARINGS

John M. McKinley, Willoughby, Howard Phillips, Mentor on the Lake, and Frank Siciliano and John McNeice, Cleveland, Ohio, assignors to Clevite Corporation, a corporation of Ohio Application August 21, 1948, Serial No. 45,464

6 Claims. (Cl. 90—33)

In the art of manufacturing half round bearings for internal combustion engines many existing requirements have to be met in an economical manner if the production of such bearings is to be successful. Apart from the physical requirements of fatigue performance, etc., is the requirement of precision duplication. Such close tolerances are specified as to concentricity of inner and outer surfaces and over-all circumferential length between parting line surfaces that the bearings when shipped in lots of many thousands, will all be interchangeable. This interchangeability requirement must be fulfilled at both the engine assembly line and at the servicing garage. Modern engine production practices are such that manual fittings of bearing shells to engine blocks and connecting rods and crankshafts and the use of shims have long since been eliminated. This was possible only through the development of the ability to machine the engine block, connecting rods, crankshaft and bearings in uniformity within the bounds of very close tolerances.

The bearing shells usually comprise a lamination of two or more metals, such as steel, for the back and an inner thinner layer of anti-friction metal in the form of an alloy or metal mixture, such as babbitt, copper-lead, etc. The shape may be a plain cylindrical half shell or a half shell with side flanges.

Many operations are involved in advancing the production from a bimetal blank to the ultimate precise half bearing. In the final precision finishing steps several broaching operations are performed on the bearing shell and each operation is followed by an instrument inspection, i. e., each machine operator is teamed with an inspector whereby any exceeding of tolerances will be detected by the inspector before a large number of defective operations are performed. While this coupling of an inspector with each operator restricts production, this close teaming is the only known practical way prohibitive losses in defective, nearly completed shells may be avoided. Even so the inspection is not one hundred percent on all shells.

The bearing shells arrive at the broaching department with the back or outer circumferential surface in a finished condition and with the side edges substantially parallel. The parting line edges are gross; i. e. the over-all circumferential dimension of the shell at this stage is variable and considerably in excess of the ultimate dimension. This ultimate dimension is important for the aim is to approach a mathematical circle when two halves are assembled together. The thickness of the shell wall may vary and is in excess of the ultimate dimension, and this excess is in the bearing metal lamination. Present practice is to perform a parallel rough broaching operation on the parting line edges to leave about .010″ excess at each parting line edge or about .020″ excess in the over-all circumferential length of the shell. The shell is put through another parallel broaching machine operation to precision finish the parting line edge surfaces relative to the ultimate circumferential length of the outer finished surface of the shell.

In both of the foregoing described edge broaching operations the shell is held in a block or fixture of the machine which has a female circumferential surface conforming precisely to the finished outer circumferential surface of the shell. The shell thus is clamped to the fixture surface in such manner as to avoid pressure distortions while rigidly supporting the shell parting line ends during the broach cutting of the edges. The shell is then moved to another machine wherein a fixture is used which also has a female circumferential surface corresponding to the outer finished circumferential surface of the shell. Mechanical means for clamping the shell therein by pressure exerted on the finished parting line edges while exposing the entire inner unfinished bearing surface of the shell, is provided. The final broaching operation is then effected to finish the journal bearing surface of the shell.

While the procedure generally described would seem to be inflexible enough to maintain the required uniformity, nevertheless unforseeable difficulties arise at times for it is not economically possible to maintain a one hundred percent inspection of every bearing produced. Should there occur, for example, an escape of a few bearing shells from the rough broaching operation to the last or final step of broaching the journal bearing surface and without having passed through the parting line finishing stage take place, visual inspection would not detect them. Since a day's production and consequently shipment amounts to many thousands of bearings, the escaped, defective shells would corrupt the entire shipment. The result would be and has been the return of the entire lot for a complete or one hundred percent inspection of each bearing in the lot. In such an instance the loss to the bearing manufacturer is severe for the margin of profit does not leave much leeway for such added expense.

The general object of the present invention, therefore, is to improve the foregoing outlined procedure whereby certain steps thereof from machine to machine can be eliminated and the prevailing chances for error decreased.

More specifically, our invention contemplates the combining of certain of the required broaching operations into a single machine operation wherein a multiplicity of dissimilar bearing shell surfaces may be broach finished with about one-half of the apparatus and personnel now required to accomplish the same work.

A still further object of our invention is to effect the final surface precisioning of the parting line surfaces and the general bearing surface of the shell in one operation of the broach slide of a broaching machine whereby all possibility of journal surface finishing of shells not having had parting line surface finishing, is eliminated.

A still further object is the provision of an apparatus for effecting a transfer of the clamping forces exerted on a bearing shell from the arcuate body portion of the shell to the parting line ends of the shell or vice versa, whereby the parting line ends and the journal contacting surface of the bearing shell may be precision finished in one cycle of operation of an open surface broaching machine.

Other objects and advantages of the invention will be apparent from the following detailed description of preferred forms of embodiment of the invention, reference being made to the accompanying drawings wherein—

Figure 5 shows the positioning of the rough finished blank in a precision finishing broaching machine by action on the rough finished parting lines of the shell;

Figure 6 shows the step of dynamically clamping the arcuate part of the shell body while exposing the parting ends of the shell for a broach cut thereon;

Figure 7 shows the precision finishing of the shell ends while dynamically holding the shell body;

Figure 8 shows the step of transferring the clamping action from the arcuate part of the shell body to the precision finished parting lines of the shell before release of the dynamic clamp; and Figure 9 shows the final arcuate broaching of the journal contacting surface of the bearing shell while exerting the clamping forces on the parting lines of the shell.

The apparatus referred to in the preamble and statement of objects is subject to some variation in that it is possible to obtain the benefits thereof while varying the sequence of some of the steps about to be described. Here but one main demonstration of the means of fulfilling the apparatus in finishing a non-flanged shell will be given with practical variations in the sequence of steps noted.

Figure 1:
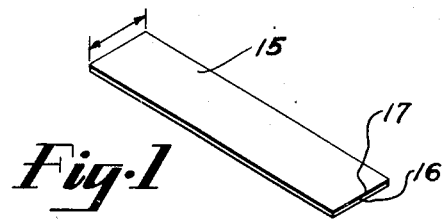
Figure 1 shows a bimetallic bearing blank with parallel sides.

In Figure 1 of the drawings a bearing shell blank 15 is shown as comprising a cold rolled steel backing lamination 16 and a lamination of bearing metal 17. As indicated, the thickness of the steel back is considerably greater than the thickness of the bearing metal facing. The blank 15 has parallel sides. The over-all length of the blank is in excess of the over-all circumferential length of the ultimate half shell.

Figure 2:
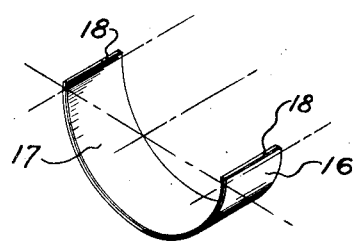
Figure 2 shows the blank of Figure 1 pressed or coined to a rough half shell.

The blank 15 is formed into a rough shell 16 in the well known manner by die mechanism in a press. It is preferred to utilize a press of sufficient capacity to effect coining of the steel back surface to thereby produce a half-round arcuate external precision surface with excess metal at the ends 18, as indicated in Figure 2.

Figure 3:
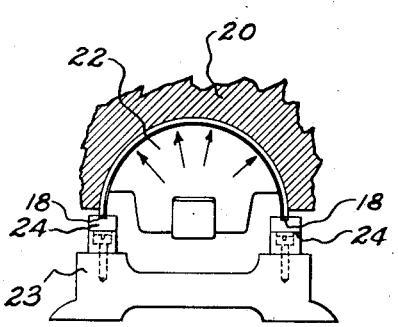
Figure 3 is a diagrammatic representation of the step of rough precisioning the parting lines of the shell.

The rough shell is placed in a broaching machine having a clamping mechanism consisting of a block 20 having an arcuate cavity which matches or is complementary to the coined external arcuate surface of the rough shell as shown in Figure 3. A clamping member 22 clamps the body of the shell to the block 20 and the block rests upon a horizontal support which serves to gauge the bottom arcuate edge of the rough shell. The support and block terminate short of the ends 18 of the rough shell and the core 22 also clears these ends. The shell ends 18 are disposed in the path of flat broach tools 24 carried in a reciprocating machine slide 23 so that a down stroke of the slide causes the tools 24 to remove the desired amount of surplus metal at the shell ends. In practice it has been found advisable to leave about .010" of metal at each shell end. The foregoing steps thus produce a shell which is precise as to back arcuate surface, as to parallel arcuate edges and precise as to excess of overall circumferential length.

The shell then is advanced to another broaching machine station in which the order of operation can be the removal of the surplus .010" of metal at the ends and then final precision finishing of the bearing surface of the shell or precision finishing of the shell bearing surface and then final finishing of the parting line edges. The first order of operation mentioned will be demonstrated here.

In order to follow such a sequence of steps outlined it is necessary that an alternate application of clamping forces be applied, first to the arcuate portion of the shell while the parting line edges are being finished and then the application of the clamping forces to the finished parting line ends of the shell while the arcuate broaching is being effected.

The foregoing is effected by the use of a dynamic clamping means associated with the broaching tools and which is carried along with them by the broach slide of the machine.

Figure 4:
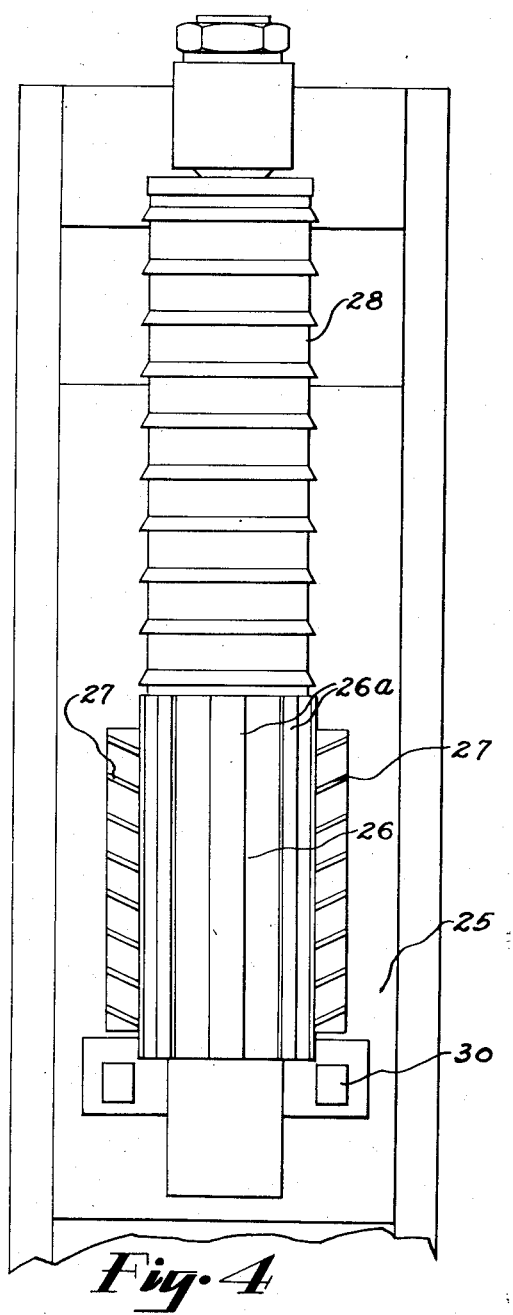
Figure 4 is an elevational view of a dynamic clamping and broaching implement.

Thus in Figure 4 is shown the broaching tools 27 mounted on the slide 25 at each side of a fluted-like clamping bar 26. Spaced from and above the bar 26 is disposed the arcuate broaching tool 28. The clamping bar 26 is preferably made of a suitable hardened tool steel and the parallel lands 26a thereof have a key action as well as a radial clamping action upon the unfinished bearing metal surface of the arcuate shell. This comes about as follows. The circumferential surfaces of the lands are on a circle which is greater than the mean radius of the unfinished surface of the shell. When the shell is placed in the block or anvil 50 it is supported on a bottom ledge of the block to engage primarily the lower edge of the steel lamination of the shell. This ledge does not extend much beyond the thickness of the steel. Positioning cams 30, located on the broach slide immediately below the broach tools 27 and the lower end of the clamping bar 26, serve to properly locate the shell in the block 50 before the lands of the bar begin to engage the unfinished arcuate surface of the shell. As the lands move downwardly the unfinished arcuate surface of the shell is engaged thereby and a radial clamping force as well as a downward clamping force is exerted on the shell. The lower part of the lands may be tapered slightly to facilitate the slight grooving of the unfinished arcuate surface of the shell. The effect on the bearing metal surface is to form or tend to form a series of grooves by a rubbing, coining action of the clamping bar lands. Thus the clamping forces are distributed throughout the arcuate surface of the shell.

In Figure 6 the clamping bar 26 is shown as having moved downwardly and is exerting the mentioned clamping forces.

In Figure 7 the broaching tools 27 are precision finishing the parting line ends of the shell while the bar is moving downwardly simultaneously therewith.

In Figure 8, a pair of clamping members 40 of any suitable form have been swung into clamping engagement with the precision finished ends of the shell while the bar 26 is still functioning as a clamp. These clamps are operated by a mechanism not shown and are in the nature of fixed or static clamps distinguishing themselves from the dynamic clamps which move relative to the bearing while holding the same.

In Figure 9, the bar 26 has traversed the shell and has been followed by the arcuate broaching tool 28. This tool precision finishes the arcuate bearing surface of shell while the fixed or static clamping members 40 continue to clamp the shell.

The finished shell is removed from the block 50 after the return or upward stroke of the broach slide.

It is to be understood that other forms of clamping means may be utilized for clamping the arcuate portion of the shell.

It is apparent that the occasion for error between the two stations heretofore existing on the final precision finishing of the shell has been eliminated since both precision finishing operations are performed in one broaching machine or station by one continuous stroke of the broaching ram or tool carrying slide. While thus meeting the human error problem a considerable saving in actual production costs is effected by the elimination of an entire station in the production line with consequent savings in inspection, transportation and machine operation.

Having thus described our invention, we claim:

1. In a broaching machine for precision finishing of bearing half shells, a back-up block having a recess complementary in shape to the exterior of the bearing shell to support said shell; a sliding tool carrier; a tool on the carrier comprising a portion for dynamically clamping the bearing surface to the back-up block during the first part of the machine stroke and a broaching portion for finishing the bearing surface during a second part of the broaching stroke; and a pair of broaching tools mounted on the tool carrier adjacent and parallel to the dynamic clamping portion of said tool to finish the parting edges of the bearing half shell while it is dynamically clamped said back-up block having a pair of static clamps to engage said broached parting edges before the release of said dynamic clamping force.

2. In a broaching machine for precision finishing of bearing half shells, a back-up block having a recess complementary in shape to the exterior of the bearing shell to support said shell; a sliding tool carrier; a tool mounted on the carrier comprising a portion for dynamically clamping the bearing surface to the back-up block during the first part of the machine stroke and a broaching portion for finishing the bearing surface during the second part of the broaching stroke; a pair of broaching tools mounted on the tool carrier adjacent and parallel to the dynamic clamping portion of said tool to finish the parting edges of the bearing half shell while it is dynamically clamped said back-up block having a pair of static clamps to engage said broached parting edges before the release of said dynamic clamping force; and bearing parting edge positioning cams positioned on said tool carrier ahead of said dynamic clamping portion.

3. In a broaching machine for precision finishing of bearing half shells, a back-up block having a recess complementary in shape to the exterior of the bearing shell to support said shell; a sliding tool carrier; a tool on the carrier comprising a clamping portion for dynamically clamping the bearing surface to the back-up block during the first part of the machine stroke and a broaching portion for finishing the bearing surface during a second part of the broaching stroke, said clamping portion being provided with longitudinal grooves and lands on its clamping surface; and a pair of broaching tools mounted on the tool carrier adjacent and parallel to the dynamic clamping portion of said tool to finish the parting edges of the bearing half shell while it is dynamically clamped, said back-up block having a pair of static clamps to engage said broached parting edges before the release of said dynamic clamping force.

4. In a broaching machine for precision finishing of bearing half shells, a back-up block having a recess complementary in shape to the exterior of the bearing shell to support said shell; a sliding tool carrier; a tool on the carrier comprising a portion for dynamically clamping the bearing surface to the back-up block during the first part of the machine stroke and a broaching portion for finishing the bearing surface during the second part of the broaching stroke, said clamping portion being provided with longitudinal grooves and lands on its clamping surface; a pair of broaching tools mounted on the tool carrier adjacent and parallel to the dynamic clamping portion of said tool to finish the parting edges of the bearing half shell while it is dynamically clamped, said back-up block having a pair of static clamps to engage said broached parting edges before the release of said dynamic clamping force; and bearing parting edge positioning cams positioned on said tool carrier ahead of said dynamic clamping portion.

5. In a broaching machine for precision finishing of bearing half shells, a back-up block having a recess complementary in shape to the exterior of the bearing shell to support said shell; a sliding tool carrier; a tool on the carrier comprising a portion for dynamically clamping the bearing surface to the back-up block during the first part of the machine stroke and a broaching portion for finishing the bearing surface during the second part of the broaching stroke; a pair of broaching tools mounted on the tool carrier adjacent and parallel to the dynamic clamping portion of said tool to finish the parting edges of the bearing half shell while it is dynamically clamped; and shell end clamping means adapted to clamp the shell after the ends have been broached by said end broaching tools but before the release of said dynamic clamping force.

6. In a broaching machine for precision finishing of bearing half shells, a back-up block having a recess complementary in shape to the exterior of the bearing shell to support said shell; a sliding tool carrier; a tool on the carrier comprising a portion for dynamically clamping the bearing surface to the back-up block during the first part of the machine stroke and a broaching portion for finishing the bearing surface during the second part of the broaching stroke; a pair of broaching tools mounted on the tool carrier adjacent and parallel to the dynamic clamping portion of said tool to finish the parting edges of the bearing half shell while it is dynamically clamped; bearing parting edge positioning cams positioned on said tool carrier ahead of said dynamic clamping portion; and shell end clamping means adapted to clamp the shell after the ends have been broached by said end broaching tools but before the release of said dynamic clamping force.

JOHN M. McKINLEY.
HOWARD PHILLIPS.
FRANK SICILIANO.
JOHN McNEICE.

References Cited in the file of this patent

UNITED STATES PATENTS

| Number | Name | Date |
|---|---|---|
| 1,749,761 | Eggenweiler | Mar. 11, 1930 |
| 1,761,926 | Landers | June 3, 1930 |
| 1,916,516 | Landers | July 4, 1933 |
| 1,961,928 | Hart | June 5, 1934 |